United States Patent [19]

Myers

[11] Patent Number: 5,342,125
[45] Date of Patent: Aug. 30, 1994

[54] FEEDSCREW FOR INJECTION MOLDING AND EXTRUSION

[75] Inventor: Jeffrey A. Myers, Saline, Mich.

[73] Assignee: Great Lakes Feedscrews, Inc., Tecumseh, Mich.

[21] Appl. No.: 882,699

[22] Filed: May 14, 1992

[51] Int. Cl.$^5$ .............................................. B01F 7/08
[52] U.S. Cl. ..................................... 366/89; 366/323
[58] Field of Search ................. 366/89, 88, 79, 80, 366/82, 81, 90, 318, 319, 322, 323; 425/207, 208; 159/2.2, 2.3

[56] References Cited

U.S. PATENT DOCUMENTS

| | | |
|---|---|---|
| 3,102,694 | 9/1963 | Frenkel . |
| 3,633,880 | 1/1972 | Newmark .................. 366/89 |
| 4,155,655 | 5/1979 | Chiselko et al. . |
| 4,173,417 | 11/1979 | Kruder . |
| 4,197,092 | 4/1980 | Bretz . |
| 4,221,811 | 9/1980 | Czegledi . |
| 4,277,182 | 7/1981 | Kruder . |
| 4,285,600 | 8/1981 | Kruder . |
| 4,299,792 | 11/1981 | Nunn . |
| 4,306,848 | 12/1981 | Nunn . |
| 4,356,140 | 10/1982 | Kruder . |
| 4,363,768 | 12/1982 | Kruder . |
| 4,639,143 | 1/1987 | Frankland, Jr. ........ 366/90 |
| 4,752,136 | 6/1988 | Colby . |
| 4,840,492 | 6/1989 | Nakamura ............... 366/89 |
| 4,925,313 | 5/1990 | Nunn . |
| 4,944,906 | 7/1990 | Colby et al. . |
| 5,035,509 | 7/1991 | Kruder . |
| 5,071,256 | 12/1991 | Smith et al. . |

FOREIGN PATENT DOCUMENTS

| | | | |
|---|---|---|---|
| 2443811 | 9/1973 | Fed. Rep. of Germany ...... 425/208 |
| 0028656 | 3/1978 | Japan ..................................... 366/319 |
| 0198132 | 11/1984 | Japan ....................................... 366/79 |
| 1016812 | 1/1986 | Japan ....................................... 366/79 |
| 0242809 | 10/1986 | Japan . |
| 3084904 | 4/1988 | Japan ....................................... 366/79 |
| 0923873 | 4/1982 | U.S.S.R. .................................. 366/79 |

Primary Examiner—Timothy F. Simone
Assistant Examiner—Tony Soohoo
Attorney, Agent, or Firm—Howard & Howard

[57] ABSTRACT

A feedscrew for an extruder or molding apparatus has an elongated body with a helical thread formed thereon defining a first channel "A". At the start of a mixing section, a channel "B" is cut in the center of the channel "A" and both channels are of the same pitch. The channels start at the same depth, but the channel A decreases in depth to a minimum and the channel B increases in depth to a maximum. The channel B then decreases in depth to a minimum and the channel A increases in depth to a maximum where the channels are again at the same depth. This channel within a channel configuration is repeated along the mixing section. The purpose of the arrangement is to compress and decompress the material being fed through the assembly to obtain the desired mixing action for low shear homogenization of the viscous plastic polymer.

15 Claims, 1 Drawing Sheet

FEEDSCREW FOR INJECTION MOLDING AND EXTRUSION

BACKGROUND OF THE INVENTION

The present invention relates generally to an apparatus for mixing plastic material and, in particular, to a feedscrew for mixing plastic molding material for injection molding and extrusion.

A screw having a helical flight and rotated in a tubular barrel can be utilized to move, and crush and/or mix granular materials. For example, there is shown in the U.S. Patent No. 3,102,694 an apparatus for crushing and mixing at least two components. The apparatus includes an outer barrel component at least partly interiorly threaded and an inner worm component, the barrel surrounding and being axially shiftable relative to the worm, each with lands between adjacent thread groove convolutions. The grooves of the barrel and the worm face one another and define a passage for a medium to be mixed. The minor radii of the barrel thread convolutions and the major radii of the worm convolutions are respectively located on an internal and external envelope which is preferably conical. The envelopes are preferably parallel to each other and have their axes coincident with the barrel axis. They taper towards the exit or entry so that by a relative axial displacement of the components the radial clearance between the envelopes can be adjusted. The areas of the cross-sections of the thread grooves vary at least over a part of the length of the passage between an maximum and a minimum value so that the cross-section of the one groove increases while that of the other groove decreases whereby, when in operation a medium moves in the passage, material is transferred between the grooves in the components as giver and taker, where in the giver screw of decreasing cross-sectional area of groove the land of the helical thread is narrower than the groove, and where in the taker screw of increasing groove cross-sectional area the land of the helical thread is wider than the groove.

The U.S. Patent No. 4,155,655 shows a method and apparatus for feeding an additive to a plastic resin in an extruder. An extruder screw is preferably three stage screw including a first melting stage having a feed section, a transition section and a metering section. A second or mixing stage comprises a low pressure section, a second transition section, a second metering section, and preferably a mixing section. The channel depth, that is, the distances from the root radius of the screw to the outside diameter of the screw, is greater in the low pressure section than in the metering section. Thus, the resin pressure in the low pressure section will be maintained at atmospheric or substantially atmospheric pressure. The third or venting and discharge stage comprises a second low pressure section, a third transition section and a third metering section.

The U.S. Patent No. 4,197,092 shows a high pressure coal gasifier feeding apparatus in the form of a centrifugal pump for feeding pulverized coal into a reactor of a high pressure coal gasification system. The coal is pulverized and fed by conventional means into a hopper wherein the coal is mechanically pumped, by a modified screw which compacts the coal and releases entrained air and gasses from the coal, to an impeller which serves to centrifugally sling the coal at high velocity into the reactor.

A machine for mixing, metering and dispensing fluids such as polyurethane, elastomers, etc. is shown in the U.S. Patent No. 4,223,811. The mixing chamber includes a cylindrical housing for a rotatable shaft having four gears which rotate with the shaft and have threads which run parallel to one another. A first gear is a suction gear and provides suction to aid in drawing the component into the mixing chamber. Two of the gears enable mixing of several components entering the mixing chamber to form the polyurethane. The fourth gear is a pressure gear which, together with the mixing gears, aids in discharging the polyurethane from the mixing chamber. The threads on the mixing gears are interrupted.

U.S. Patent No. 4,173,417 shows an extruder screw having a section for assuring complete melting and mixing of resinous material. The screw section includes outwardly extending barrier flights disposed intermediate the conveying flights to divide the passage into channels extending side by side helically along the screw section. Each of the channels has a depth which varies cyclically through at least four cycles along the helical length of the channel, the minimum depth portions of the channels on opposite sides of the barrier flight means defining wave crests which are displayed helically from each other. The barrier flights adjacent each wave crest are undercut to provide sufficient clearance between its outermost surface and the inner barrel wall to prevent the flow thereover of molten resinous material from the channel containing an area of decreasing depth to an adjacent area of the other channel. The outer width of the barrier flight means is shorter than that of the conveying flight means and less than eight percent of the screw pitch, so that the shear energy imparted to molten material flowing over the barrier flight means is low. See also the U.S. Patent No. 4,277,182 and the U.S. Patent No. 4,285,600.

SUMMARY OF THE INVENTION

The present invention concerns a plastic material mixing screw of the type having a mixing section of approximately 30% to 40% of the screw length located near the output end. A feedscrew for a mixing apparatus has an elongated body having a generally circular cross section and a generally helical thread formed on the body and having a land of a predetermined diameter defining a first channel "A". At the start of the mixing section, a channel "B" is cut in the center of the channel "A" and both channels are of the same pitch. The channels start at the same depth, but the channel A decreases in depth to a minimum and the channel B increases in depth to a maximum. The channel B then decreases in depth to a minimum and the channel A increases in depth to a maximum where the channels are again at the same depth. This channel within a channel configuration is repeated along the mixing section. The purpose of the arrangement is to compress and decompress the material being fed through the assembly to obtain the desired mixing action for low shear homogenization of the viscous plastic polymer.

The first channel is formed along a predetermined length section of the body by the thread, the first channel varying in depth along a length thereof from a first maximum depth at a first predetermined distance below the land to a first minimum depth at a second predetermined distance below the land and back to the first maximum depth. The second channel is formed along the predetermined length section in the first channel, the second channel varying in depth along a length thereof between a second minimum depth at the first predetermined distance below the land to a second maximum depth at a third predetermined depth below the land and back to the second minimum depth. The channels peek at the first and second minimum depths and these peeks can be offset by spacing them a greater or a lesser distance apart than the pitch of the channels.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
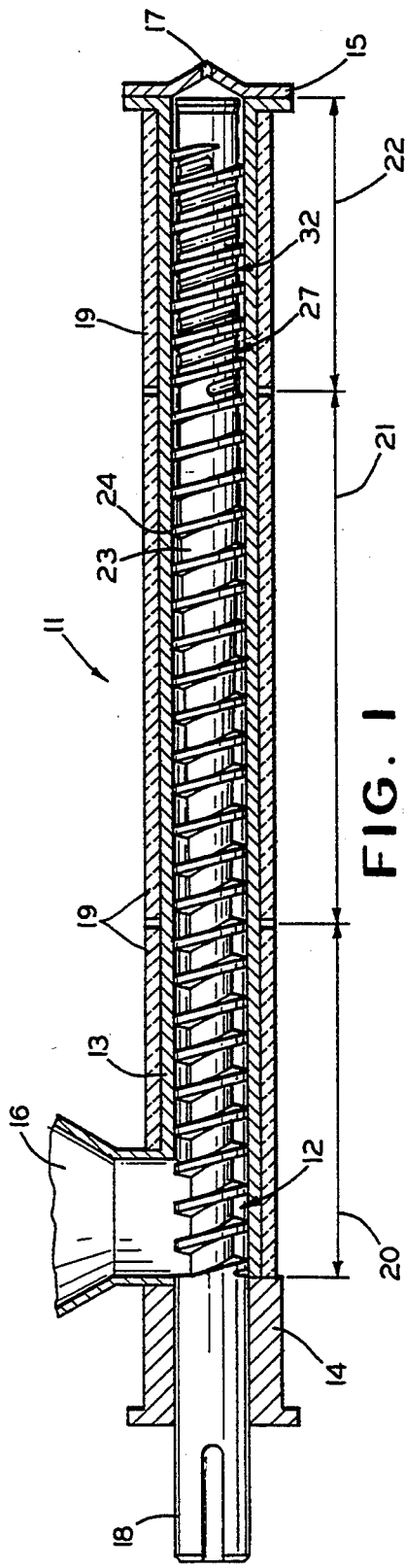
FIG. 1 is a cross-sectional front elevation view of an extrusion apparatus having a feedscrew in accordance with the present invention.

There is shown in the FIG. 1, a plastics extruding apparatus 11 having a feedscrew 12 positioned within a generally tubular elongated barrel 13. The barrel 13 is closed at an inlet end by a feed end closure 14 and is closed at an outlet end by a discharge end closure 15. A radially extending resin feed funnel 16 is attached to the barrel 13 at the inlet end for feeding plastic resin material to the interior of the barrel 13. A discharge orifice 17 is formed in the discharge end closure 15 for discharging mixed and molten resin into mold or die (not shown). A drive extension 18 is attached to one end of the feedscrew 12 and extends through the feed end closure 14 for coupling to a rotary drive means (not shown). Surrounding the exterior of the barrel 13 are a plurality of conventional heating means 19 for melting the resin.

The feedscrew 12 is divided into a feed section 20, a transition section 21 and a metering section 22. In operation, resin is supplied to the resin feed funnel 16 in the form of granules, pellets, flakes, powder, or any other suitable form. The rotation of the feedscrew 12 conveys the resin through the sections 20, 21, and 22 wherein the resin is melted by heat supplied by the heating means 19 and the frictional heat developed by the shearing and mixing of the resin between the rotating feedscrew 12 and the interior wall of the barrel 13. The resin pressure is raised above atmospheric pressure in the transition section 21 and the metering section 22 due to the increased channel depths of the feedscrew in these sections. The resin is then conveyed through the metering section 22 where the pressure is raised and the mixture is discharged through the discharge orifice 17 which may be in the form of a die for forming an extrudate into whatever shape is desired.

Figure 2:
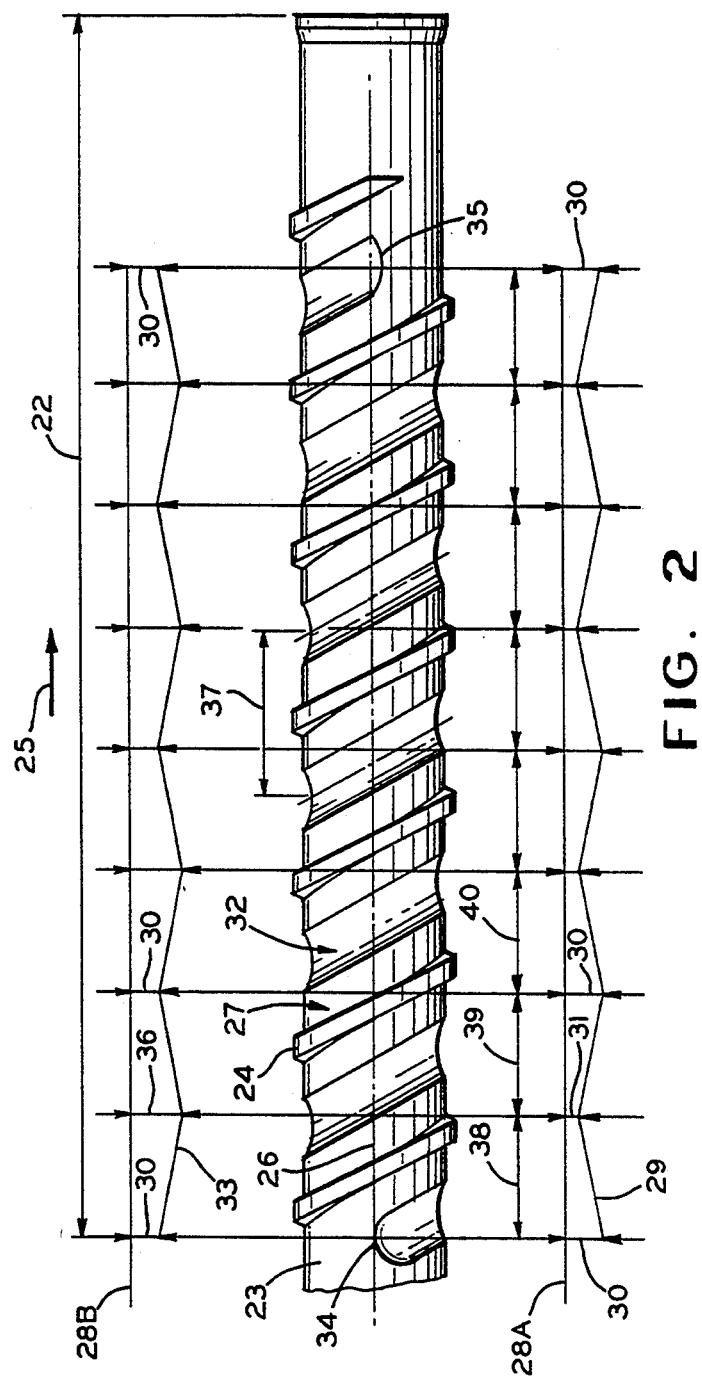
FIG. 2 is an enlarged fragmentary view of the metering section of the feedscrew shown in the FIG. 1.

The FIG. 2 is an enlarged fragmentary view of the metering section 22 portion of the feedscrew 12 shown in the FIG. 1. The feedscrew 12 has a body 23 of generally circular cross section with a continuous helical thread 24 formed thereon having a land of a predetermined diameter. The feedscrew 12 is rotated in a counterclockwise direction as viewed from the left hand end to cause the resin material (not shown) to move in the direction of an arrow 25. The feedscrew body 23 has a longitudinal axis 26 about which the feedscrew 12 is rotated. The exterior surface of the feedscrew body 23, which is smaller in diameter than the land of the thread 24, has a predetermined length section on which a groove or a first channel 27 (channel A) is formed by the thread 24 and through which the solid resin material flows. As shown in the FIG. 2, the predetermined length section can be the entire metering section 22, or could be a portion thereof. The first channel 27 varies in depth along the metering section 22. Shown near the bottom of the FIG. 2 is a generally horizontal reference line 28A representing the diameter of the land of the thread 24. Below the reference line 28A extends a second reference line 29 representing the profile of the first channel 27. At the right hand end of the metering section 22, the first channel 27 is at a first maximum depth which is a first predetermined distance 30 below the diameter of the land of the thread 24. The diameter of the first channel 27 increases toward the right hand end of the feedscrew body 23 to a first minimum depth which is a second predetermined distance 31 below the diameter of the land of the thread 24. The first channel profile then decreases in depth back to the first predetermined distance 30. The depth of the first channel 27 alternates between the maximum and minimum depths throughout the extent of the metering section 22.

There also is formed in the feedscrew body 23 a second channel 32 (channel B) which is positioned approximately in the center of the first channel 27 and extends at the same pitch as the first channel. The second channel 32 has a profile represented by a second reference line 33 near the top of the FIG. 2. The second channel 32 begins at a starting point 34 at the left hand end of the metering section 22 and terminates at an ending point 35 at the right hand end of the metering section 22. At the starting point 34, the second channel 32 has a second minimum depth which is the same diameter as the first channel 27 as represented by the spacing of the second channel profile reference line 33 by the first predetermined distance 30 from the land diameter reference line 28B. However, the second channel 32 increases in depth as the first channel 27 decreases in depth. Moving from the left hand of the metering section 22, the second channel 32 increases in depth to a second maximum represented by a third predetermined distance 36 at the same point on the feedscrew body 23 that the first channel 27 is at the first minimum depth represented by the second predetermined distance 31. The second channel 32 then decreases in depth back to the first predetermined distance 30 at the same point that the first channel 27 has increased in depth to the first predetermined distance 30. As shown by the second channel profile reference line 33, the second channel 32 alternately increases and decreases in depth up to the ending point 35.

As an example, let us assume that the diameter of the land of the thread 24 is 4.49" represented by the land diameter reference lines 28A and 28B. The thread 24 can typically have a 4.50" pitch 37 and be 0.45" in width at the land. In the feed section 20, the first channel 27 can be 0.60" deeper than the land. The diameter of the first channel increases in the transition section to a depth of 0.20" represented by the first predetermined distance 30. The depth of the first channel 27 further decreases to a minimum of 0.08" represented by the second predetermined distance 31. The depth of the second channel 32 varies between a minimum of 0.20" represented by the first predetermined distance 30 and a maximum of 0.43" represented by the third predetermined distance 36.

The specific profile shown in the FIG. 2 is illustrative of many different profiles each having alternating depth first and second channels. The profile can have any length, can have any number of complete and partial revolutions, and can be repeated any number of times in the metering section. The peeks or lobes formed in the channel A can be offset to balance the pressure drop by maintaining the distance between the maximum and minimum points less than the length of one revolution of the channel or by rotating the start of a second channel A with respect to the start of a first channel A. In the FIG. 2, a first portion 38 of the metering section 22 representing the distance between adjacent maximum and minimum points on both of the profiles 29 and 33 is shorter than the pitch 37. Similar length second portion 39 and third portion 40 illustrate how the channels 27 and 32 alternate between the maximum and minimum depths along the body 23. Thus, the points at which each of the channels 27 and 32 reach the associated minimum and maximum depths will be offset about the circumference of the body 23.

The mixing action of the feedscrew causes a constant compression-decompression of the resin material without the use of a barrier flight. When the channel A is at its maximum depth, the channel B is at its minimum depth. Conversely, when the channel B is at its maximum depth, the channel A is at its minimum depth. The material in the channels is alternately subjected to a filling and squeezing action which provides for low shear homogenization of the viscous plastic polymer. The feedscrew in accordance with the present invention can be used with the extrusion apparatus described above or a plastic injection molding apparatus.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A feedscrew for a plastic material mixing apparatus comprising:
    an elongated body having a generally circular cross section and a longitudinal axis;
    a generally helical thread formed on at least a section of said body extending outwardly from said longitudinal axis and having a land of a predetermined diameter;
    a first channel formed along a predetermined length of said section of said body by said thread, said first channel varying in depth between a first maximum depth below said land and a first minimum depth below said land; and
    a second channel formed along said predetermined length of said section of said body in said first channel, said second channel varying in depth between a second minimum depth below said land and a second maximum depth below said land, said first maximum depth and said second minimum depth being at a first predetermined point along said longitudinal axis, said first minimum depth and said second maximum depth being at a second predetermined point along said longitudinal axis and said first maximum depth being equal to said second minimum depth.

2. The feedscrew according to claim 1 wherein said thread has a constant pitch and said first and second channels are formed with said pitch.

3. The feedscrew according to claim 2 wherein a distance between said first predetermined point and said second predetermined point is different than said pitch.

4. The feedscrew according to claim 1 wherein said second channel is narrower than said first channel and is formed approximately in a center of said first channel.

5. A feedscrew for a plastic material mixing apparatus comprising:
    an elongated body having a generally circular cross section and a longitudinal axis;
    a generally helical thread formed on at least a section of said body extending outwardly from said longitudinal axis with a constant pitch and having a land of a predetermined diameter;
    a first channel formed along a predetermined length of said section of said body by said thread, said first channel varying in depth at least once from a first maximum depth below said land to a first minimum depth below said land and back to said first maximum depth; and
    a second channel formed along said predetermined length of said section of said body in said first channel, said second channel varying in depth from a second minimum depth below said land to a second maximum depth below said land and back to said second minimum depth, said first maximum depth and said second minimum depth being at first common points along said longitudinal axis and said first minimum depth and said second maximum depth being at second common points along said longitudinal axis.

6. The feedscrew according to claim 5 wherein said first and second channels are formed with said constant pitch.

7. The feedscrew according to claim 5 wherein said second channel is narrower than said first channel and is formed approximately in a center of said first channel.

8. The feedscrew according to claim 5 wherein said first maximum depth of said first channel is equal to said second minimum depth of said second channel.

9. A feedscrew for a plastic material mixing apparatus comprising:
    an elongated body having a generally circular cross section and a longitudinal axis;
    a generally helical thread formed on said body extending outwardly from said longitudinal axis with a constant pitch and having a land of a predetermined diameter;
    a first channel formed along said body by said thread, said first channel alternately varying in depth between a first maximum depth a first predetermined distance below said land and a first minimum depth a second predetermined distance below said land; and
    a second channel formed along said body in approximately a center of said first channel and at said constant pitch, said second channel varying in depth between a second minimum depth said first predetermined distance below said land and a second maximum depth a third predetermined distance below said land, said first predetermined distance being greater than said second predetermined distance and said third predetermined distance being greater than said first predetermined distance.

10. The feedscrew according to claim 9 wherein said first channel is at said first predetermined distance when said second channel is at said first predetermined distance and said first channel is at said second predetermined distance when said second channel is at said third predetermined distance.

11. The feedscrew according to claim 9 wherein said first channel varies in depth between said first predetermined distance below said land and said second predetermined distance below said land at least twice along said body.

12. The feedscrew according to claim 9 wherein said second channel varies in depth between said first predetermined distance below said land and said third predetermined distance below said land at least twice along said body.

13. The feedscrew according to claim 9 wherein a first point in said first channel is at said first predetermined distance and an adjacent second point in said first channel is at said second predetermined distance and a distance along said longitudinal axis of said body between said first point and said second point is different than said constant pitch.

14. The feedscrew according to claim 9 wherein a first point in said second channel is at said first predetermined distance and a second point in said second channel is at said third predetermined distance and a distance along said longitudinal axis of said body between said first point and said second point is different than said constant pitch.

15. The feedscrew according to claim 9 wherein a first point along said longitudinal axis is at said first predetermined distance below said land in said first channel and in said second channel and an adjacent second point is at said second predetermined distance below said land in said first channel and at said third predetermined distance below said land in said second channel and a distance along said longitudinal axis of said body between said first point and said second point is different than said constant pitch.

* * * * *